(12) United States Patent
Shi

(10) Patent No.: US 11,920,729 B1
(45) Date of Patent: Mar. 5, 2024

(54) ROTATABLE PHOTO BOOTH

(71) Applicant: Shenzhen Kemaituo Technology Co., Ltd., Shenzhen (CN)

(72) Inventor: Honghan Shi, Shenzhen (CN)

(73) Assignee: Shenzhen Kemaituo Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/447,202

(22) Filed: Aug. 9, 2023

(30) Foreign Application Priority Data

Aug. 12, 2022 (CN) .......................... 202222134790.5

(51) Int. Cl.
| | | |
|---|---|---|
| *F16M 13/02* | (2006.01) | |
| *F16M 11/20* | (2006.01) | |
| *F16M 11/28* | (2006.01) | |
| *G03B 15/10* | (2021.01) | |
| *G03B 17/56* | (2021.01) | |

(52) U.S. Cl.
CPC ...... *F16M 13/022* (2013.01); *F16M 11/2014* (2013.01); *F16M 11/2064* (2013.01); *F16M 11/28* (2013.01); *G03B 15/10* (2013.01); *G03B 17/561* (2013.01); *F16M 2200/068* (2013.01); *F16M 2200/08* (2013.01)

(58) Field of Classification Search
CPC .... G03B 17/48; G03B 17/561; G03B 17/563; G03B 15/03; G03B 15/035; G03B 15/06; G03B 2215/0575; G03B 2215/0582; G03B 2215/0585; H04N 5/222; F16M 11/08; F16M 11/28; F16M 13/02; F16M 13/022; F16M 13/04
See application file for complete search history.

(56) References Cited

U.S. PATENT DOCUMENTS

| | | | | |
|---|---|---|---|---|
| 11,665,306 | B1 * | 5/2023 | Hou ....................... | G03B 37/02 348/40 |
| 2016/0219192 | A1 * | 7/2016 | Rosenberry ............ | F16M 13/00 |

FOREIGN PATENT DOCUMENTS

| | | | |
|---|---|---|---|
| CN | 208171883 U | 11/2018 | |
| CN | 210408388 U | 4/2020 | |
| CN | 213904032 U | 8/2021 | |
| CN | 217238598 U * | 8/2022 | ........... F16M 11/046 |
| CN | 217467517 U * | 9/2022 | |

* cited by examiner

*Primary Examiner* — Clayton E. LaBalle
*Assistant Examiner* — Fang-Chi Chang
(74) *Attorney, Agent, or Firm* — Nitin Kaushik

(57) ABSTRACT

The disclosure provides a rotatable photo booth, comprising a base, a supporting platform, a holographic fan and a shooting bracket, wherein the supporting platform is disposed on the base and comprises a supporting seat and a light-transmitting plate, and the shooting bracket is disposed between the base and the supporting platform, is rotated by a driving device, and at least partially extends from the supporting platform to hold shooting devices. The holographic fan disposed in a mounting cavity formed by covering the light-transmitting plate on the supporting seat, is controlled by the controller to display animations, videos or stereoscopic patterns.

7 Claims, 5 Drawing Sheets

ROTATABLE PHOTO BOOTH

CROSS-REFERENCE TO RELATED APPLICATIONS

This application claims priority to a Chinese Patent Application No. 202222134790.5, filed on Aug. 12, 2022, the entire content of which is hereby incorporated by reference.

TECHNICAL FIELD

The disclosure relates to the technical field of shooting apparatuses, in particular to a rotatable photo booth.

BACKGROUND

A rotatable photo booth, also known as a photo booth can be rotated with 360 degree, is an apparatus that allows a subject to be shot on a rotatable platform thereof. Relative to a traditional photo booth, the apparatus allows the subject to be shot during rotation, which significantly improves the user experience and the fun of shooting.

SUMMARY

The disclosure provides a rotatable photo booth, comprising a base, a supporting platform, a holographic fan and a shooting bracket, wherein the supporting platform is disposed on the base and comprises a supporting seat and a light-transmitting plate, the light-transmitting plate is covered on the supporting seat and forms a mounting cavity with the supporting seat, the holographic fan disposed in the mounting cavity is electrically connected with a controller and is controlled by the controller to display animations, videos or stereoscopic patterns, and the shooting bracket which at least partially extends from the supporting platform to hold shooting devices is disposed between the base and the supporting platform and is rotated by a driving device.

In one embodiment, a mounting seat disposed in the mounting cavity at least partially protrudes from the bottom of the mounting cavity and a light-emitting member is arranged on one side of a portion of the mounting seat which protrudes from the bottom of the mounting cavity, and the holographic fan is disposed in the mounting seat.

In one embodiment, the inner side of the mounting cavity is equipped with a light-emitting member.

In one embodiment, through holes are formed on the light-transmitting plate.

In one embodiment, the supporting platform is connected with the base by a supporting shaft and spaced apart from the base, a bearing is sleeved on the supporting shaft, a fluted disc is connected with the outer ring of the bearing, the shooting bracket is disposed on the fluted disc, and the output end of the driving device is engaged with the fluted disc and drives the shooting bracket to rotate by rotating the fluted disc.

In one embodiment, the shooting bracket comprises a telescopic frame and a telescopic arm, the telescopic frame is disposed on the fluted disc, at least one end of the telescopic frame extends from the supporting platform along the radial direction of the supporting shaft, one end of the telescopic arm is connected with the end of the telescopic frame which extends from the supporting platform, and a plurality of holders which are respectively used to hold shooting devices of different sizes are disposed at the end of the telescopic arm away from the telescopic frame.

In one embodiment, the telescopic frame is connected with the telescopic arm through an angle adjuster, which is disposed on the telescopic frame and has a hinge hole and a plurality of adjusting holes which are semicircular shaped evenly distributed around the hinge hole, the telescopic arm is hinged to the angle adjuster through the hinge hole and has a fixing hole corresponding to the plurality of adjusting holes, and the fixing hole is fixed to the adjusting holes at different positions through a fixing member to adjust the angle between the telescopic arm and the telescopic frame.

In one embodiment, the other end of the telescopic frame also extends from the supporting platform along the radial direction of the supporting shaft and is connected with another telescopic arm, and the end of the telescopic arm far away from the telescopic frame is connected with another holographic fan which is electrically connected with the controller and is controlled by the controller to display animations, videos or stereoscopic patterns.

In one embodiment, the supporting platform is in threaded connection with the supporting shaft.

In one embodiment, the base is in threaded connection with the supporting shaft.

DETAILED DESCRIPTION OF THE EMBODIMENTS

Figure 1:
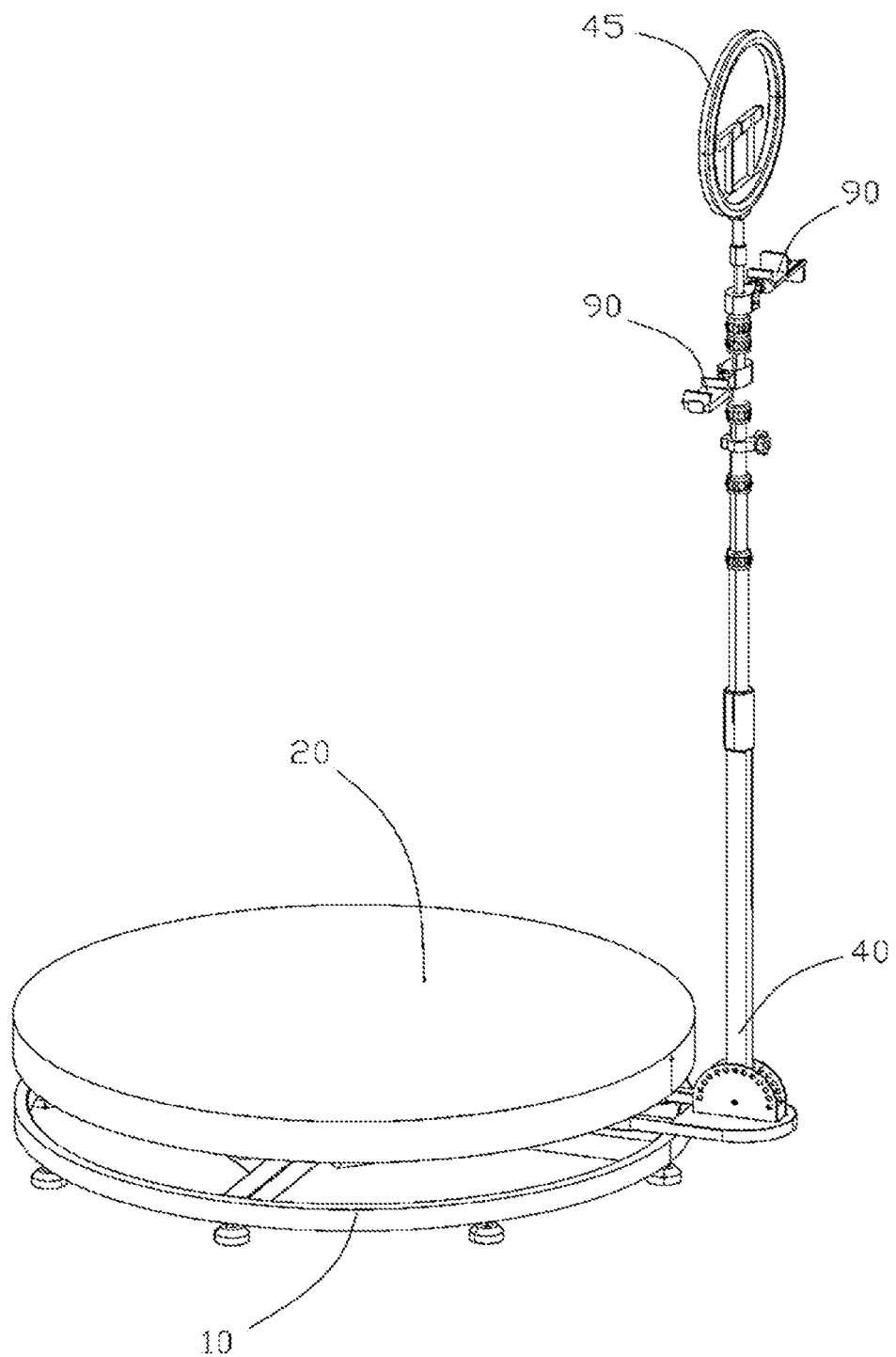
FIG. 1 is an overall schematic diagram according to one embodiment of the disclosure.

The technical schemes of the embodiments of the disclosure will be clearly and completely described hereinafter with reference to the drawings in the embodiments of the disclosure. Obviously, the described embodiments constitute only one part of the embodiments of the disclosure instead of all the embodiments. All other embodiments obtained by those of ordinary skill in the art based on the embodiments of the disclosure without creative work fall into the protection scope of the disclosure. It can be understood that the drawings provide only references and illustrations, and that they are not used to limit the disclosure. The connections shown in the drawings are aimed at only clarifying the descriptions rather than limiting the ways of connecting.

It should be noted that when a component is considered to be "connected" to another component, it may be directly connected with the other component, or there may be a centering component. Unless otherwise defined, all technical and scientific terms used herein have the same meaning as commonly understood by those skilled in the art of the disclosure. It should also be noted that, unless otherwise explicitly defined and limited, the terms "mount", "interconnect", and "connect" are to be construed in a broad sense and may indicate, for example, a fixed connection, a detachable connection or an integral connection, a mechanical connection, an electrical connection, or an internal communication between two elements. For those of ordinary skill in the art, the specific meanings of the above terms in the disclosure can be understood with respect to the specific contexts. The terms used in the description of the disclosure are only for the purpose of describing specific embodiments, and are not intended to limit the disclosure.

It should also be noted that, in the description of the disclosure, the orientational or positional relationship indicated by the terms "central", "upper", "lower", "left", "right", "vertical", "horizontal", "inner", "outer" and the like is based on the orientational or positional relationship shown in the drawings, which is only for the convenience of describing the disclosure and simplifying the description rather than intended to indicate or imply that the apparatus or element referred to must have a particular orientation or must be constructed and operated in a particular orientation. Therefore, the relationship should not be construed as limiting the disclosure. Furthermore, the terms "first", "second", and "third" are used for descriptive purposes only and are not to be construed as indicating or implying relative importance.

Figure 2:
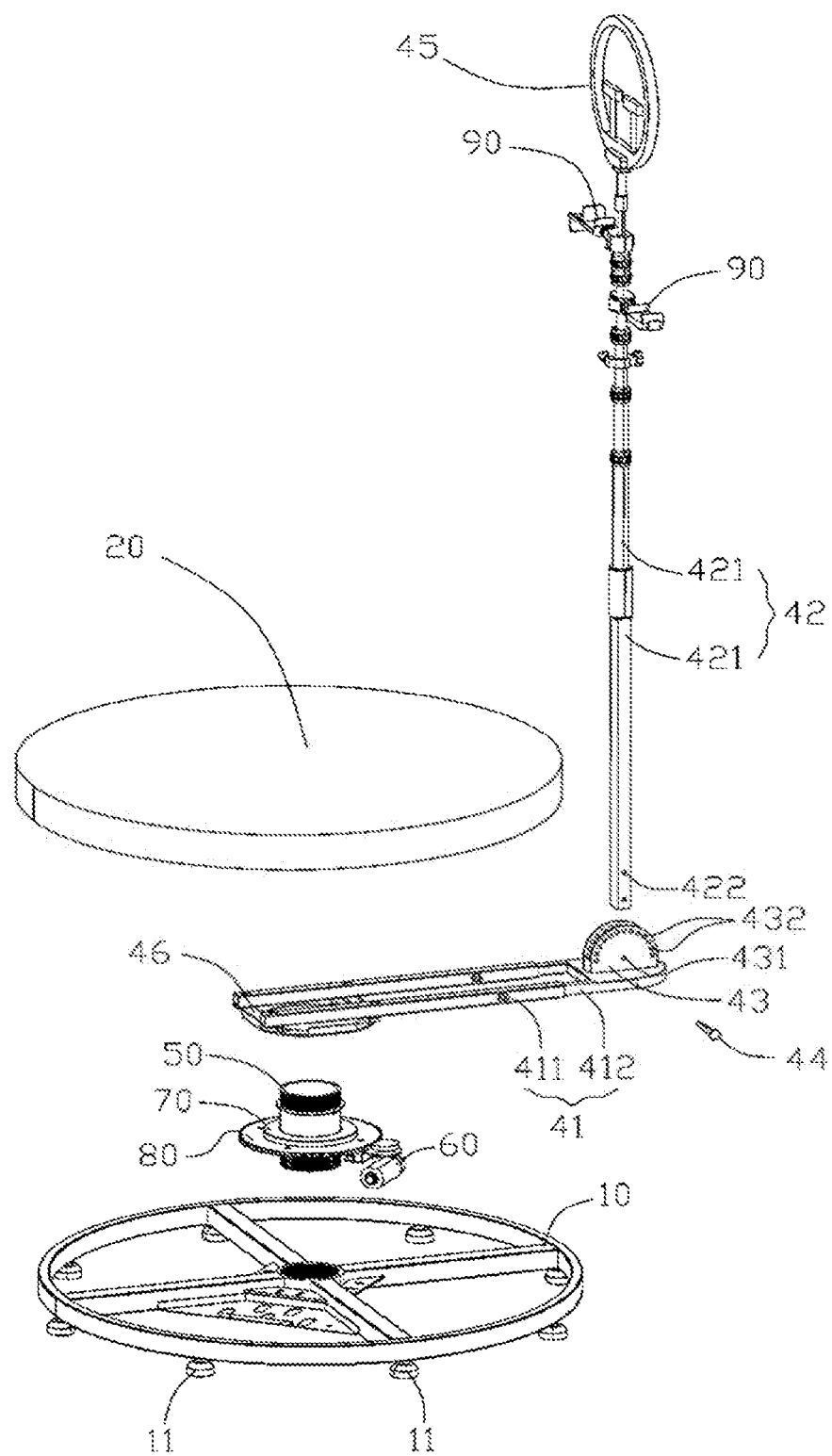
FIG. 2 is an exploded view according to one embodiment of the disclosure.
Figure 3:
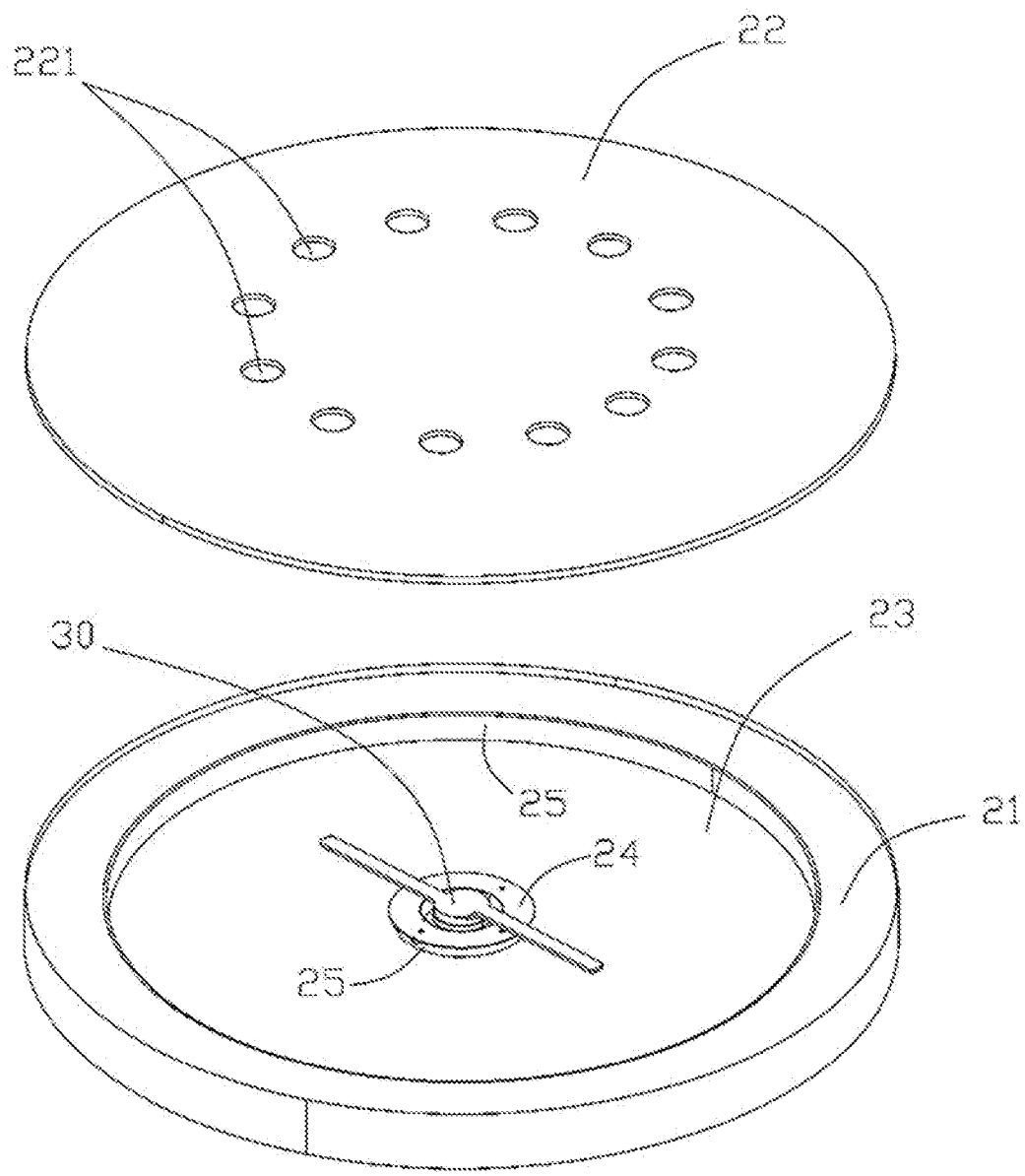
FIG. 3 is an exploded view according to one embodiment of the supporting platform of the disclosure.

Compared with the prior art, the disclosure has the following beneficial effects: the holographic fan, which is disposed in the mounting cavity formed between the supporting seat and the light-transmitting plate and is controlled by the controller to display animations, videos or stereoscopic patterns, is capable of displaying different shooting backgrounds while the photo booth is being used for shooting, thereby enriching the background effects of the shot photos or videos and improving the user experience. Referring to FIGS. 1-3, the disclosure provides a rotatable photo booth, comprising a base 10, a supporting platform 20, a holographic fan 30, and a shooting bracket 40, wherein the supporting platform 20 is disposed on the base 10, the shooting bracket 40 is rotatably disposed between the base 10 and the supporting platform 20 and is used to hold shooting devices, and the holographic fan 30 is disposed inside the supporting platform 20 to display animations, videos, or stereoscopic patterns during shooting so as to increase the shooting background effects.

Figure 5:
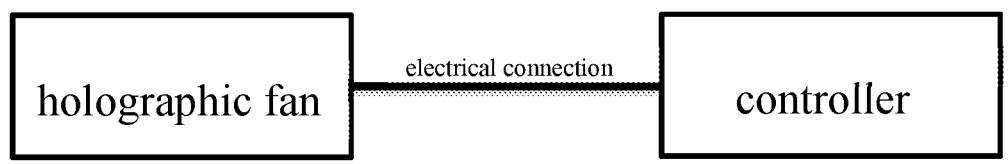
FIG. 5 is a schematic diagram showing the connection of the holographic fan and the controller according to one embodiment of the disclosure.

The supporting platform 20 comprises a supporting seat 21 and a light-transmitting plate 22, wherein the light-transmitting plate 22 is covered on the supporting seat 21 to form a mounting cavity 23 therebetween, and the holographic fan 30 is disposed in the mounting cavity 23 and is electrically connected with a controller which controls it to display animations, videos, or stereoscopic patterns, as shown in FIG. 5.

When the photo booth is being used, the controller controls the rotating speed of the holographic fan 30 and the LED lamp beads thereon to display different shooting backgrounds, as shown in FIG. 5.

Optionally, the light-transmitting plate 22 is made of tempered glass, such that the animations, videos, or stereoscopic patterns displayed by the holographic fan 30 can be better captured by the light-transmitting plate 22.

Further, a mounting seat 24 is disposed in the mounting cavity 23 and the holographic fan 30 is disposed in the mounting seat 24, wherein the mounting seat 24 at least partially protrudes from the bottom of the mounting cavity 23 and is equipped with a light-emitting member 25 on one side of a protruding portion.

Specifically, the mounting seat 24 is disposed at the center of the mounting cavity 23, and the light-emitting member 25 is disposed at the protruding portion of the mounting seat 24 to further enrich the shooting backgrounds or increase the brightness of the shooting backgrounds during shooting.

Optionally, the inner side of the mounting cavity 23 is also equipped with a light-emitting member 25 to further enrich the shooting backgrounds or increase the brightness of the shooting backgrounds.

Optionally, the light-emitting member 25 is an LED flexible strip or an LED light bar.

Further, through holes 221 are formed on the light-transmitting plate 22 to enable the holographic fan 30 to move the surrounding air to flow when it is in operation, so as to enhance the cooling effects on the holographic fan 30 and the light-emitting member 25 and to avoid over-temperature and low cooling efficiency in the mounting cavity 23, such that the lifespan of the holographic fan 30 and the light-emitting member 25 is not affected.

The supporting platform 20 and the base 10 are connected with a supporting shaft 50 at a certain distance, so as to reserve space for connecting the shooting bracket 40 and for mounting a driving device 60 to rotate the shooting bracket 40.

Further, a bearing 70 is sleeved on the supporting shaft 50, a fluted disc 80 is connected with the outer ring of the bearing 70, the shooting bracket 40 is disposed on the fluted disc 80, and the output end of the driving device 60 is engaged with the fluted disc 80 and drives the shooting bracket 40 to rotate by rotating the fluted disc 80.

The shooting bracket 40 is disposed between the base 10 and the supporting platform 20, and is driven by the driving device 60 to rotate, wherein at least part of the shooting bracket 40 extends from the supporting platform 20 to hold shooting devices.

The shooting bracket 40 comprises a telescopic frame 41 and a telescopic arm 42, the telescopic frame 41 is disposed on the fluted disc 80 and synchronously rotates with the fluted disc 80 under the driving force of the driving device 60, and the telescopic arm 42 is connected with the end of the telescopic frame 41 extending out of the supporting platform 20 and synchronously moves with the telescopic frame 41.

Further, the telescopic frame 41 is detachably connected with the fluted disc 80 with a connecting frame 46, such that the shooting bracket 40 can be replaced and maintained.

In an embodiment, one end of the telescopic frame 41 extends from the supporting platform 20 along the radial direction of the supporting shaft 50 and is connected with the telescopic arm 42, wherein a plurality of holders 90 are disposed at the end of the telescopic arm 42 away from the telescopic frame 41 and the plurality of holders 90 are respectively used to hold shooting devices of different sizes.

The telescopic frame 41 at least comprises a first portion 411 and a second portion 412, the first portion 411 is connected with the fluted disc 80, the second portion 412 is movably fitted to the first portion 411, and the extending length of the telescopic frame 41 can be adjusted by pushing or pulling it along the radial direction of the supporting shaft 50 so that the position of the shooting devices can be adjusted according to the user's needs.

Further, the telescopic frame 41 is connected with the telescopic arm 42 through an angle adjuster 43 which is disposed on the telescopic frame 41, a hinge hole 431 and a plurality of adjusting holes 432 are disposed on the angle adjuster 43, and the plurality of adjusting holes 432 are evenly distributed in a semicircular with the hinge hole 431 as the center.

The telescopic arm 42 is hinged to the angle adjuster 43 through the hinge hole 431 and is equipped with a fixing hole 422 corresponding to the plurality of adjusting holes 432, and the fixing hole 422 is fixed to the adjusting holes 432 at different positions through a fixing member 44 to adjust the angle between the telescopic arm 42 and the telescopic frame 41.

Optionally, the number of the adjusting holes 432 is 13, such that the telescopic arm 42 has 13 adjusting positions relative to the telescopic frame 41. With the hinge hole 431 as the center, an included angle of 15 degrees is formed between adjacent adjusting holes 432 and the hinge hole 431.

The telescopic arm 42 comprises at least two telescopic rods 421, and each of the telescopic rods 421 is equipped with at least one holder 90.

Optionally, the holder 90 is connected with the telescopic rod 421 in an adjustable manner along the radial direction of the telescopic rod 421, such that the position of the holder 90 can be changed on the telescopic rod 421 according to the user's needs.

Optionally, the end of the telescopic arm 42 far away from the telescopic frame 41 is further connected with a supplementary light 45, such that light can be supplemented when selfies are taken, thereby producing better photos or videos and improving the user experience.

Figure 4:
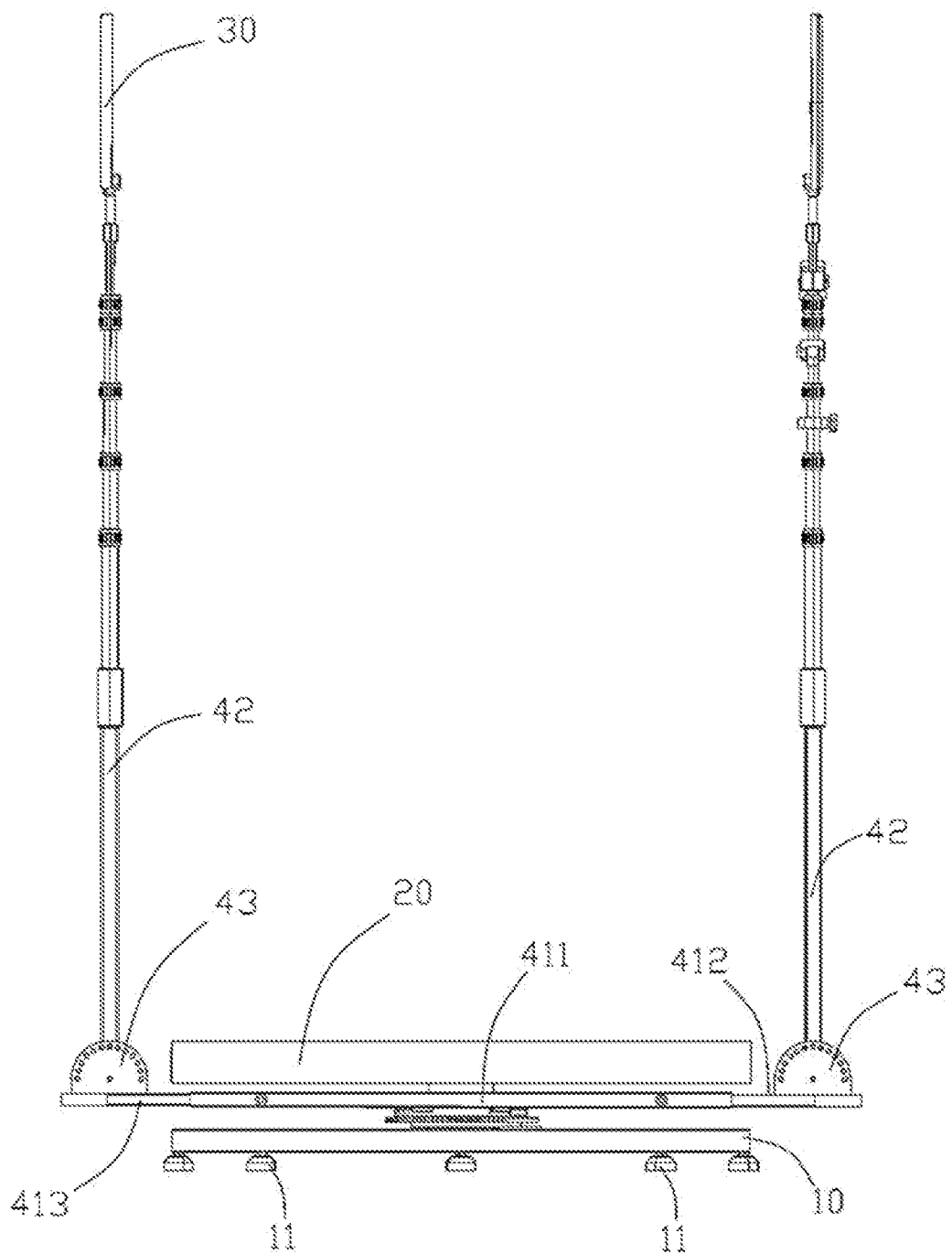
FIG. 4 is an overall schematic diagram according to one embodiment of the disclosure.

Referring to FIG. 4 and FIG. 2, in another embodiment, the other end of the telescopic frame 41 also extends from the supporting platform 20 along the radial direction of the supporting shaft 50 and is connected with another telescopic arm 42, another holographic fan 30 is connected with the end of the telescopic arm 42 away from the telescopic frame 41, and the holographic fan 30 is electrically connected with the controller and is controlled by the controller to display animations, videos or stereoscopic patterns.

With the holographic fan 30 disposed on the telescopic arm 42, the shooting backgrounds can be further enriched when the shooting device is shooting in the horizontal direction, thereby providing better user experience.

Specifically, the telescopic frame 41 further comprises a third portion 413, which is disposed opposite to the second portion 412 and movably fitted to the first portion 411.

Further, the end of the third portion 413 away from the second portion 412 is also equipped with an angle adjuster 43, and the telescopic arm 42 is connected with the angle adjuster 43 with the included angle being adjustable.

Further, the supporting platform 20 is in threaded connection with the supporting shaft 50, and the base 10 is in threaded connection with the supporting shaft 50, such that the supporting platform 20, the base 10 and the shooting bracket 40 are connected in a modularized and detachable manner, thereby making it easy both to package during the manufacturing process and to assemble after purchase and replace corresponding modules of different sizes according to the user's needs.

Optionally, a plurality of height-adjustable foot cups 11 are further mounted on the bottom of the base 10, such that the supporting platform 20 can be adjusted to a horizontal state when the photo booth is assembled.

In the description and claims of the present application, the terms "comprise/include" and "have/comprise" and the variations thereof are used to specify the presence of stated features, values, steps or components, but do not preclude the presence or addition of one or more other features, values, steps, components or the combinations thereof.

Some features of the disclosure are described in different embodiments for sake of clear illustration, however, these features may also be described in one single embodiment. In contrast, some features of the disclosure are described in one embodiment for the sake of brevity, however, these features may also be described in different embodiments alone or in any appropriate combination.

The above description includes only the preferred embodiments of the disclosure, and is not intended to limit the disclosure. Any modifications, equivalent substitutions, improvements and the like, which are made within the spirit and principle of the disclosure shall be included in the scope of protection of the disclosure.

What is claimed is:

1. A rotatable photo booth, comprising a base, a supporting platform, a holographic fan and a shooting bracket,
    wherein the supporting platform is disposed on the base and comprises a supporting seat and a light-transmitting plate, the light-transmitting plate is covered on the supporting seat and forms a mounting cavity with the supporting seat,
    the holographic fan disposed in the mounting cavity is electrically connected with a controller and is controlled by the controller to display animations, videos or stereoscopic patterns, and
    the shooting bracket which at least partially extends from the supporting platform to hold shooting devices is disposed between the base and the supporting platform and is rotated by a driving device,
    wherein the supporting platform is connected with the base by a supporting shaft and spaced apart from the base, a bearing is sleeved on the supporting shaft, a fluted disc is connected with an outer ring of the bearing, the shooting bracket is disposed on the fluted disc, and an output end of the driving device is engaged with the fluted disc and drives the shooting bracket to rotate by rotating the fluted disc,
    the shooting bracket comprises a telescopic frame and a telescopic arm, the telescopic frame is disposed on the fluted disc, at least one end of the telescopic frame extends from the supporting platform in a radial direction of the supporting shaft, one end of the telescopic arm is connected with the end of the telescopic frame which extends from the supporting platform, and a plurality of holders which are respectively used for holding shooting devices are disposed at one end of the telescopic arm away from the telescopic frame,
    the other end of the telescopic frame also extends from the supporting platform in the radial direction of the supporting shaft and is connected with another telescopic arm, and one end of the telescopic arm away from the telescopic frame is connected with another holographic fan which is electrically connected with the controller and is controlled by the controller to display animations, videos or stereoscopic patterns.

2. The rotatable photo booth of claim 1, wherein a mounting seat disposed in the mounting cavity at least partially protrudes from a bottom of the mounting cavity and a light-emitting member is arranged on one side of a portion of the mounting seat which protrudes from the bottom of the mounting cavity, and the holographic fan is disposed in the mounting seat.

3. The rotatable photo booth of claim 1, wherein an inner side of the mounting cavity is equipped with a light-emitting member.

4. The rotatable photo booth of claim 1, wherein through holes are formed on the light-transmitting plate.

5. The rotatable photo booth of claim 1, wherein the telescopic frame is connected with the telescopic arm through an angle adjuster, which is disposed on the telescopic frame and has a hinge hole and a plurality of adjusting holes which are semicircular shaped evenly distributed around the hinge hole, the telescopic arm is hinged to the angle adjuster through the hinge hole and has a fixing hole corresponding to the plurality of adjusting holes, and the fixing hole is fixed to the adjusting holes at different positions through a fixing member to adjust an angle between the telescopic arm and the telescopic frame.

6. The rotatable photo booth of claim 1, wherein the supporting platform is in threaded connection with the supporting shaft.

7. The rotatable photo booth of claim 1, wherein the base is in threaded connection with the supporting shaft.

\* \* \* \* \*